Feb. 2, 1965  H. D. BAUMANN  3,168,011
REVERSIBLE PNEUMATIC ACTUATOR
Filed Sept. 19, 1963
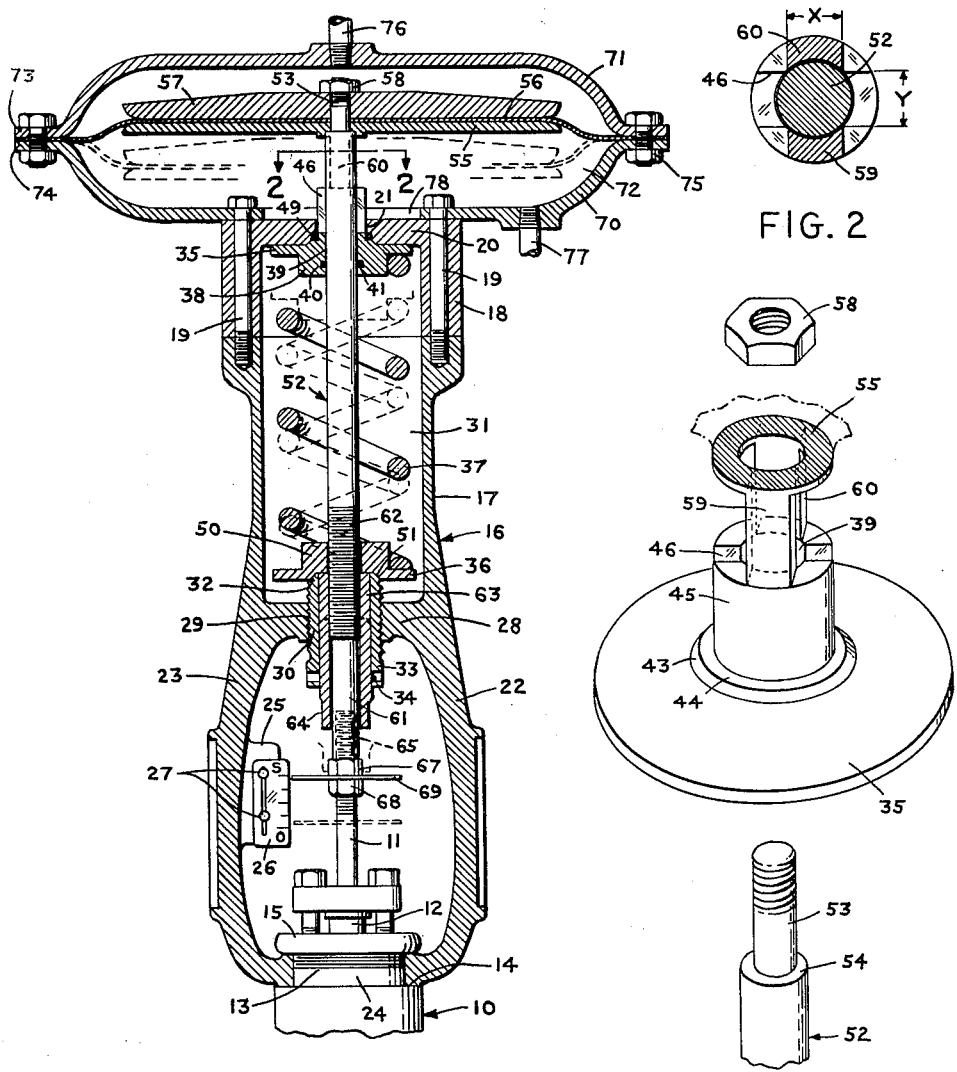
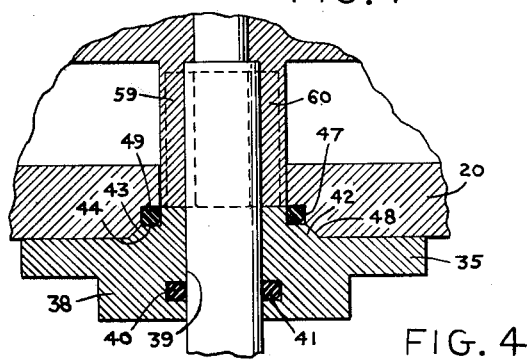
HANS D. BAUMANN
INVENTOR.
BY Daniel A. Bobis
Atty

United States Patent Office 3,168,011
Patented Feb. 2, 1965

3,168,011
REVERSIBLE PNEUMATIC ACTUATOR
Hans D. Baumann, Decatur, Ill., assignor to Worthington Corporation, Harrison, N.J., a corporation of Delaware
Filed Sept. 19, 1963, Ser. No. 310,009
13 Claims. (Cl. 92—59)

This invention relates to reversible fluid actuators, and, more particularly, to certain new and useful improvements in such actuators.

Fluid operated actuators are in widespread use in the control field. A primary application of such actuators is in the field of so-called motor operated or power operated valves, but there are many other and varied uses. They may be applied wherever a control element must be selectively moved from one position to another.

As the art of such fluid actuators developed, it became evident that it was desirable to have a single, standard structure which would be capable of being quickly changed in the field from one type of stroking characteristic to another, namely, a first condition in which the actuator stem moves down with an increasing fluid signal and a second condition wherein the actuator stem moves up with an increasing fluid signal. For example, in valve actuation, it may be desirable to have a valve which is normally spring biased into open position, but which will be moved by the actuator into closed position upon increasing fluid signal. Conversely, it may be desirable to have a valve normally spring biased into closed position, but which will be moved by the actuator into open position upon increasing fluid signal. A major requirement of such an actuator is that it must be capable of being quickly converted in the field from one stroking characteristic to the other without impairment or sacrifice of the operating efficiency or manufacturing economy of the valve.

An example of the prior art development of such reversible stroking characteristic fluid actuators is found in U.S. Patent 2,903,011, issued to Lewis D. Long. The prior art reversible fluid actuators, as represented by Patent 2,903,011, presented certain difficulties, however, which impaired their use in quality installations. The O-ring sealing system of the structure of Patent 2,903,011, involving two dynamic seals, introduced an undersible amount of operating friction, partly because of the number of dynamic seals and partly because of the size of the outer dynamic seal. An additional source of undesirable friction lay in the necessity of providing means for preventing rotation of the upper cap or thrust member of the valve structure. In the actuator as designed, the number of parts was considerably increased as compared with non-reversible actuators of the same type, and certain of the parts, such as the upper thrust member, required expensive machine finishing, all of which materially increased the first cost of the actuator structure and also increased maintenance costs. A further disadvantage lay in the necessity of dismantling the whole actuator in order to adjust actuator spring compression. Still another problem arose in that because of heavy vibration or because of improper or careless installation, the reversing means slipped from locking position, thus affecting reliability of performance of the actuator. Thus, while the prior art reversible actuators of the Long type are capable of being reversed as to stroking characteristics in the field without major dismantling or removal from installed position, this was accomplished at a substantial sacrifice in first cost and in performance.

It is an object of the present invention, therefore, to provide a fluid actuator which is capable of being reversed in its stroking characteristic in the field, while in installed position, without major dismantling of the actuator and without any sacrifice in first cost or in operating performance as compared with non-reversible actuators of the same type.

Another object of the invention is to provide a reversible actuator which employs only one relatively small dynamic seal, which seal is in action only in one direction of movement of the actuator stem.

Another object of the invention is to provide a reversible actuator which requires only a minimum number of cheaply made additional parts over those required for a non-reversible actuator of the same type, and which is thus much lower in first cost and in maintenance cost than the reversible actuators known in the art.

Another object is to provide an actuator wherein once the reversal procedure has been accomplished, the actuator is positively locked in its selected stroking position and it cannot move from this position short of complete failure of the actuator structure.

Still another object of this invention is to provide an actuator wherein the actuator spring compression may be adjusted without dismantling any portion of the actuator by the turning of a single, exteriorly exposed, adjusting element with a suitable tool.

Another object of the invention is to provide a means for centering the spring buttons, either upper or lower, when the button returns to neutral or rest position against its end wall of the range spring chamber after a given operation of the actuator, thereby centering the buttons relative to the actuator stem and preventing excessive frictional resistance during reciprocation of the stem.

With the above and other objects in view, as will be presently apparent, the invention consists in general of certain novel details of construction and combinations of parts hereinafter fully described, illustrated in the accompanying drawings, and particularly claimed.

In the drawings, like characters of reference indicate like parts in the several views, and FIGURE 1 is a view, partly in side elevation and partly in longitudinal section, showing the improved actuator of the instant invention, adjusted for actuation downwardly upon increasing fluid signal;

FIGURE 2 is a transverse section of the actuator stem, taken on the line 2—2 of FIGURE 1;

FIGURE 3 is a fragmentary, exploded, isometric view showing details of the upper force button and the cooperation of said button with the lower diaphragm plate when the actuator is set for actuation downwardly upon increasing fluid signal; and FIGURE 4 is a fragmentary longitudinal view, showing the relationship of the upper face button and the lower diaphragm plate when the actuator structure has been adjusted for upward actuation of the actuator stem upon increasing fluid signal.

In the drawings, the reversible actuator is shown as mounted on a device 10 which is to be actuated, the device having a movable operating rod 11 which reciprocates within a packing sleeve 12. The casing of the actuated device has a reduced portion or neck 13 forming a shoulder 14 which supports the lower end of the actuator frame. A clamping ring 15, in threaded engagement with the neck 13, firmly holds the actuator frame 16 on the actuated device 10. The movable rod 11 is threaded at its upper end for coupling with the actuator stem of the invention. The structure described thus far is not part of the invention and has only been detailed to the degree necessary to illustrate and disclose the mounting and use of the fluid actuator representing the invention.

The actuator frame 16 is, in the embodiment shown herein, formed of a lower cylindrical portion 17 and an upper cylindrical portion 18, the two portions being joined together by axially directed bolts 19.

The upper portion 18 is provided with an end wall 20 and the end wall has an axially centered aperture 21 formed therein.

Extending integrally from the lower end of the lower cylindrical portion 17 are the legs 22 and 23. These legs are joined to a mounting ring 24, which ring fits over the neck 13 and is clamped between the shoulder 14 and the clamping ring 15. The leg 23 is shown as provided with a projection 25, which carries a slotted indicating plate 26. This plate, by means of screws 27, may be adjusted to zero position, and suitable indicia may be carried thereon to tell the condition of the actuated device for a given position of the actuator.

The lower cylindrical portion 17 is also provided with an end wall 28, which has a threaded aperture 29, this aperture being axially centered and in alignment with the aperture 21 in the end wall 20 of the upper cylindrical portion. The threaded aperture 29 carries therein a threaded stop sleeve 30. This sleeve is sufficiently long that when substantially centered in the end wall 28, as shown in FIGURE 1, the upper end will project into the range spring chamber 31 defined by the inner walls of the upper and lower cylindrical portions, and the lower end will project downwardly between the legs 22 and 23.

The upper end of the stop sleeve 30 is beveled as at 32 for a purpose to be later described. The lower end may be provided with wrench flats 33, or, if desired, tool holes 34, to receive a special tool.

Within the range spring chamber 31 is housed an upper force button 35, a lower force button 36 and a range spring 37 which is positioned between the two buttons.

The upper force button 35 is provided with an annular projection 38 which fits into the end of the range spring 37 and centers the spring. The button is provided with an axial bore 39, and within the bore is cut an annular groove 40 which receives an O-ring seal 41. Projecting upwardly from the upper face of the seal is a relatively shallow frusto-conical boss 42 which presents a radially directed beveled face 43 and an axially directed shoulder 44. The button is further provided with a relatively long cylindrical projection 45, which projection 45 has a slot 46 that extends downwardly in the cylindrical projection to a point slightly above the shoulder 44, as shown.

The end wall 20 of the range spring chamber 31 is provided with an annular recess 47, which, as clearly shown in FIGURE 4, has a beveled edge 48 that mates with the radially directed beveled face 43 of the spring button. It will be noted that the annular recess 47 is of greater depth than the boss 42, providing an annular space in which is placed an O-ring seal 49.

The lower force button 36 is provided with an inwardly directed cylindrical projection 50 which receives and centers the lower end of the range spring 37. The lower face of the force button is provided with a frusto-conical recess 51 which is designed to mate with the beveled end 32 of the stop sleeve 30.

Axially centered in and reciprocating within the structure above described is the actuator stem 52. This stem is of sufficient length that it projects beyond the range spring chamber 31 at both ends. The upper end projects through the axial bore 39 of the upper force button and terminates in a reduced portion 53 which defines a shoulder 54. This reduced end receives and holds the diaphragm assembly which includes a lower diaphragm plate 55, a flexible diaphragm 56 and an upper diaphragm plate 57. The flexible diaphragm 56 is clamped between the diaphragm plates 55 and 57, and the whole assembly is held against the shoulder 54 by means of a nut 58. Projecting downwardly from the lower face of the lower diaphragm plate 55 and on opposite sides of the actuator stem 52 are the fingers 59 and 60. These fingers have a width X (FIGURE 2) which is very slightly less than the width Y of the slot 46 (FIGURE 2), so that when the diaphragm assembly is rotated 90 degrees from the position shown in FIGURES 1 and 2, into the position shown in FIGURE 4, the fingers 59 and 60 will drop easily into the slot 46. The length of the fingers 59 and 60 is preferably very slightly greater than the depth of the slot 46, shown in FIGURE 4, so that when rotated into the FIGURE 4 position, the ends of the fingers 59 and 60 will rest against the bottom of the slot 46 and at the upper end of the recess 47 for the O-ring seal 49.

Turning now to the lower end of the actuator stem 52, it will be noted that for some distance spaced from the tip end of the stem, there is a reduced portion 61, this reduced portion 61 being lesser in diameter than the diameter of the central or main portion of the stem 52. Immediately above the reduced portion 61 is a threaded portion 62 which is sized to slide freely through an axial bore in the lower force button 36. Threadedly engaged with the threaded portion of the stem 62 is an adjusting nut 63. This adjusting nut 63 has an outer diameter such that it slides freely within the stop sleeve 30 but without any lateral play. It will be noted that the adjusting nut is somewhat longer than the stop sleeve 30 so that a wrench end 64 projects beyond the end of the stop sleeve 30 when the upper ends of the adjusting nut 63 and stop sleeve 30 are in alignment, as shown in FIGURE 1. The lower end or reduced portion 61 of the stem 52 is provided with a threaded bore 65, which receives the upper threaded end of the operating rod 11. On the threaded end of said operating rod are carried nuts 67 and 68 which clampingly engage an indicator disc 69 which cooperates with the indicator shown on the slotted indicating plate 26. It will be noted that the disc 69 is operative no matter what the angular position of the actuator stem 52 about its longitudinal axis may be.

Turning now to the diaphragm casing, it will be noted that the casing comprises a lower half 70 and an upper half 71, which are generally cup-shaped so as to define a diaphragm chamber 72 when the upper and lower halves are in mating relationship. The upper and lower halves have the usual flanges 73 and 74, respectively, which receive the outer marginal edge of the flexible diaphragm 56. A series of regularly spaced bolts 75 through the mating flanges 73 and 74 provide for clamping and sealing of the diaphragm casing. The upper half of the diaphragm casing is provided with a fluid inlet-outlet 76 and the lower half of the casing is provided with a fluid inlet-outlet 77. The lower half of the diaphragm casing is also provided with an aperture 78 which is axially centered relative to the aperture 21 in the end walls 20 of the upper portion of the range spring chamber 31. The bolts 19 serve to clamp the lower half 70 of the diaphragm chamber in sealed tight relationship against the end wall 20 of the range spring chamber 31.

*Operation*

The structure having been above described in detail, attention is now given to the operation of the actuator.

In the basic installation, the actuator frame mounting ring 24 is set upon the actuator device 10, and the clamping ring 15 is turned down tightly. By means of the threads on the operating rod 11 and the lower threaded bore 65, the actuator stem 52 is connected to the operating rod.

The actuator device is now set according to the type of stroking characteristic desired by removing the bolts 75 and lifting off the upper half 71 of the diaphragm casing. If it is desired to have the actuator device move downwardly with increasing air signal so as to move the operating rod downwardly, the diaphragm assembly is then rotated to the position shown in FIGURE 1, with the lower ends of the fingers 59 and 60 resting upon the upper end of the cylindrical projection 45 of the upper force button 35. When a plane occupying the two fingers 59 and 60 is approximately at 90 degrees to the plane of the slot 46, the upper half 71 of the diaphragm casing is replaced and the diaphragm securely clamped by the bolts 75. It will be noted that when the diaphragm is so clamped, the dynamic portion of the actuator assembly will be positively held against rotation.

At this point, the stop sleeve 30 is turned by means of the wrench flats 33 or tool holes 34 to compress the range spring 37 by moving the force button 36 upwardly. The amount the sleeve 30 is turned controls the bias of the range spring 37. Under this condition of adjustment, therefore, the stop sleeve 30, by means of the force button 36, compresses the spring 37, and this pressure forces the upper force button 35 upwardly against the end wall 20 of the range spring chamber. The upper end of the cylindrical projection 45 of the upper force button pushes against the ends of the fingers 59 and 60, holding the diaphragm assembly in the upper portion of the diaphragm chamber 72. The diaphragm assembly in turn holds the actuator stem 52 in upward position, and, therefore, the operating rod 11 is likewise retained in upward or "S" position, shown on the slotted indicating plate 26. It will be noted that at this time only the upper half of the diaphragm 72 receives pressure, the diaphragm 56 forming a complete seal for the chamber. The fluid inlet-outlet 77 is opened to exhaust, and there is no problem of or need for a seal for the lower chamber.

Upon increasing fluid signal into the upper half of the diaphragm chamber 72 through the fluid inlet-outlet 76, the diaphragm assembly is forced downwardly, and the actuator stem 52 is likewise forced downwardly to reciprocate the operating rod 11, the actuator stem moving to the "O" position on the indicating plate 26. This is the dotted line position shown in FIGURE 1. As the diaphragm assembly moves downwardly, the fingers 59 and 60 cause the upper force button 35 to move downwardly in the range spring chamber 31, further compressing the spring, as shown by the dotted line position. The actuator stays in said position, therefore, until the fluid signal is removed or decreased, whereupon the range spring 37 pushes the force button 35 upwardly against the end wall 20, the fingers 59 and 60 being urged upwardly by the cylinder projection 45 on the force button, the diaphragm assembly and actuator rod then being held in retracted position.

When it is desired to change the stroking characteristics so that the actuator rod 52 moves upwardly upon increasing air signal, the bolts 75 are removed and the upper half of the diaphragm chamber is lifted off. The diaphragm assembly is then rotated 90 degrees to the position which it occupies in FIGURE 4. The fingers 59 and 60 drop downwardly into the slot 46, the stop sleeve 30 is retracted, and the diaphragm assembly will drop into the lower half of the diaphragm chamber 72. The upper half 71 of the diaphragm is then replaced. The adjusting nut 63 is then used to adjust the tension on the range spring 37. The upper force button 35 will at that point occupy a fixed position against the end wall 20 of the range spring chamber.

Upon increasing fluid signal through the fluid inlet-outlet 77, the diaphragm assembly will move upwardly into the upper half of the diaphragm chamber. The actuator stem 52 will be drawn upwardly, and the adjusting nut 63 will slide within the stop sleeve 30 and put pressure on the lower force button 36, pushing the spring upwardly against its bias into a greater stage of compression. The actuator will then remain in this position until the fluid signal decreases, whereupon the bias of the range spring 37 will urge the force button 36 and adjusting nut 63 downwardly, pushing the actuator rod 52 and diaphragm assembly into downward position.

It will be particularly noted that during the stroking characteristic just described, there is a fluid pressure in the lower half of the diaphragm chamber 72. The upper force button 35, being held tightly against the end wall 20, is sealed by the static O-ring 49. Any pressure working its way downwardly through the axial bore 39 of the spring button is sealed by the dynamic O-ring seal 41. It will be observed, therefore, that there is only one dynamic seal offering frictional resistance to the actuator stem 52. The sealing ring, being small in diameter, has only a relatively small friction surface in engagement with the actuator stem.

The presence of the beveled end 32 of the stop sleeve 30 and the frusto-conical recess 51 in the lower force button 36, which recess mates with the beveled end 32, is important. As the stop sleeve 30 moves upwardly into engagement with the lower force button 36, the mating recess and beveled end will tend to center the force button relative to the actuator stem 52, and there will be no lateral pressure on the stem. This is true also of the beveled edge 48 on the end wall 20 and the beveled face 43 on the upper force button, the said force button 35 being axially centered thereby.

While there has been herein shown and described the preferred embodiments of the invention, it is nevertheless to be understood that minor changes may be made therein without departing from the spirit and scope of the invention as claimed.

What is claimed is:
1. In a reversible fluid actuator;
   a supporting frame;
   an actuator stem reciprocally mounted in said frame and adapted at one end to be connected to a device to be actuated;
   a resilient compression means carried by said frame and surrounding said actuator stem, said compression means being positioned between longitudinally spaced first and second end walls on said frame;
   first and second force buttons at opposite ends of said compression means having axial bores slidably receiving said actuator stem;
   an axially adjustable stop means carried by said first end wall movable into engagement with said first force button;
   a closed chamber carried by said second end wall;
   movable means dividing said chamber into first and second fluid compression compartments, said means being connected to the said actuating stem, each of said compartments having a fluid access opening;
   releasable means for normally preventing rotation of said movable means, said movable means being in contact engagement with said second force button;
   and means carried by said movable means and said second force button, respectively, for adjusting the distance between said movable means and said second force button by released selected rotation of said movable means.

2. A reversible fluid actuator as set forth in claim 1, further including a dynamic seal between said axial bore of said second force button and said actuator stem.

3. A reversible fluid actuator as set forth in claim 1, further including a dynamic seal between said axial bore of said second force button and said actuator stem; and a static seal between said second force button and said second end wall.

4. A reversible fluid actuator as set forth in claim 1, further including an adjusting sleeve axially adjustably movable on said actuator stem, said sleeve having its inner end in engagement with said first force button and its outer end extending beyond said first end wall.

5. A reversible fluid actuator as set forth in claim 1, wherein said means for adjusting the distance between said movable dividing means and said second force button comprises at least one axially directed finger and recess, said finger being out of said recess in one rotated position of said movable means and said finger being in said recess in another released rotated position of said movable means.

6. A reversible fluid actuator as set forth in claim 1, said axially adjustable stop means being a sleeve surrounding said actuator stem, said sleeve having a first beveled end face;
   and a second beveled end face on said first force button, said second beveled end face being in engagement with said first beveled end face.

7. A reversible fluid actuator as set forth in claim 1, said second force button having a beveled end face in engagement with a corresponding beveled face on said second end wall.

8. A reversible fluid actuator as set forth in claim 1, said axially adjustable stop means being a sleeve surrounding said actuator stem;

and said adjusting sleeve being concentrically slidably positioned within said stop sleeve, the outer end of said adjusting sleeve normally extending beyond the outer end of said stop sleeve.

9. In a reversible fluid actuator;

a supporting frame;

an actuator stem reciprocally mounted in said frame and adapted at one end to be connected to a device to be actuated;

a resilient compression means carried by said frame and surrounding said actuator stem, said compression means being positioned between longitudinally spaced first and second end walls on said frame;

first and second force buttons at opposite ends of said compression means having axial bores slidably receiving said actuator stem;

an axially adjustable stop means carried by said first end wall movable into engagement with said first force button;

a closed diaphragm chamber carried by said second end wall, said chamber comprising opposed clamping plates;

a flexible diaphragm means dividing said chamber into first and second fluid compression compartments, said means being connected to said actuator stem at the end remote from the end connected to a device to be actuated;

each of said compartments having a fluid access opening;

releasable means for fastening the edge of said diaphragm means between said clamping plates;

said diaphragm means being in contact engagement with said second force button;

and means carried by said diaphragm means and said second force button, respectively, for adjusting the distance between said diaphragm means and said second force button by released, selected rotation of said diaphragm means.

10. A reversible fluid actuator as set forth in claim 9, further including a dynamic seal between the axial bore of said second force button, and said actuator stem;

and a static seal between said second force button and said second end wall.

11. A reversible fluid actuator as set forth in claim 9, wherein said means for adjusting the distance between said diaphragm means and said second force button comprises at least one axially directed finger and recess, said finger being out of said recess in one rotated position of said diaphragm means and said finger being in said recess in another released, rotated position of said diaphragm means.

12. A reversible fluid actuator as set forth in claim 9, said axially adjustable stop means being a sleeve surrounding said actuator stem; and said adjusting sleeve being concentrically, slidably positioned within said stop sleeve, the outer end of said adjusting sleeve normally extending beyond the outer end of said stop sleeve.

13. A reversible fluid actuator as set forth in claim 9; said axially adjustable stop means being a sleeve surrounding said actuator stem, said sleeve having a first beveled, annular end face;

said first force button having a second beveled annular end face in engagement with said first beveled end face;

and said second force button having a third beveled end face in engagement with a corresponding fourth beveled face on said second end wall.

References Cited by the Examiner
UNITED STATES PATENTS

| | | | |
|---|---|---|---|
| 2,245,966 | 6/41 | Davis | 251—61 X |
| 2,496,215 | 1/50 | Jones | 92—95 X |
| 2,541,176 | 2/51 | Rockwell | 251—61 X |
| 2,697,599 | 12/54 | Vandal | 137—270 X |
| 2,903,011 | 9/59 | Long. | |

RICHARD B. WILKINSON, *Primary Examiner.*